(12) United States Patent
Klosowski et al.

(10) Patent No.: US 6,831,636 B1
(45) Date of Patent: Dec. 14, 2004

(54) SYSTEM AND PROCESS FOR LEVEL OF DETAIL SELECTION BASED ON APPROXIMATE VISIBILITY ESTIMATION

(75) Inventors: James T. Klosowski, Rye, NY (US); Claudio T. Silva, Mahwah, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/342,450

(22) Filed: Jun. 29, 1999

(51) Int. Cl.[7] .............................................. G06T 15/00
(52) U.S. Cl. ...................................... 345/419; 345/428
(58) Field of Search ................................ 395/419, 421, 395/428, 420, 422, 552

(56) References Cited

U.S. PATENT DOCUMENTS

| | | | |
|---|---|---|---|
| 5,844,571 A | * 12/1998 | Narayanaswami | 345/422 |
| 5,872,572 A | * 2/1999 | Rosignac | 345/428 |
| 5,926,183 A | * 7/1999 | Menon et al. | 345/422 |
| 6,111,582 A | * 8/2000 | Jenkins | 345/421 |
| 6,288,730 B1 | * 9/2001 | Duluk, Jr. et al. | 345/552 |

OTHER PUBLICATIONS

John Edward Warnock, A Hidden Surface Algorithm For Computer Generated Halftone Picture, Jun. 1969, University of Utah.*

Paul S. Heckbert, et al., "Survey of Polygonal Surface Simplification Algorithms," School of Computer Science, Carnegie Mellon University, Pittsburgh, PA 15213, May 1, 1997, pp. 1–29.

James H. Clark, "Hierarchical Geometric Models for Visible Surface Algorithms," Graphics and Image Processing, University of California at Santa Cruz, Communications of the ACM, Oct. 1976, vol. 19, No. 10, pp. 547–554.

* cited by examiner

*Primary Examiner*—Don Wong
*Assistant Examiner*—Huedung X. Cao
(74) *Attorney, Agent, or Firm*—Louis J. Percello, Esq.

(57) ABSTRACT

A technique and system for selecting level-of-detail representations of geometric models to be rendered within an image processing system. For each geometric model, fractional visibility estimations are computed, thereby ranking how likely it is that a model is visible. Using these rankings, an appropriate level-of-detail for each geometric model is selected to optimize the rendering process by reducing the number of primitives that need to be rendered, while preserving the quality of the final image produced and displayed upon the screen. Visibility estimates for the geometric models are summed to produce a number which is then used to scale the number of primitives used in the level-of-detail representation of the geometric models.

13 Claims, 4 Drawing Sheets

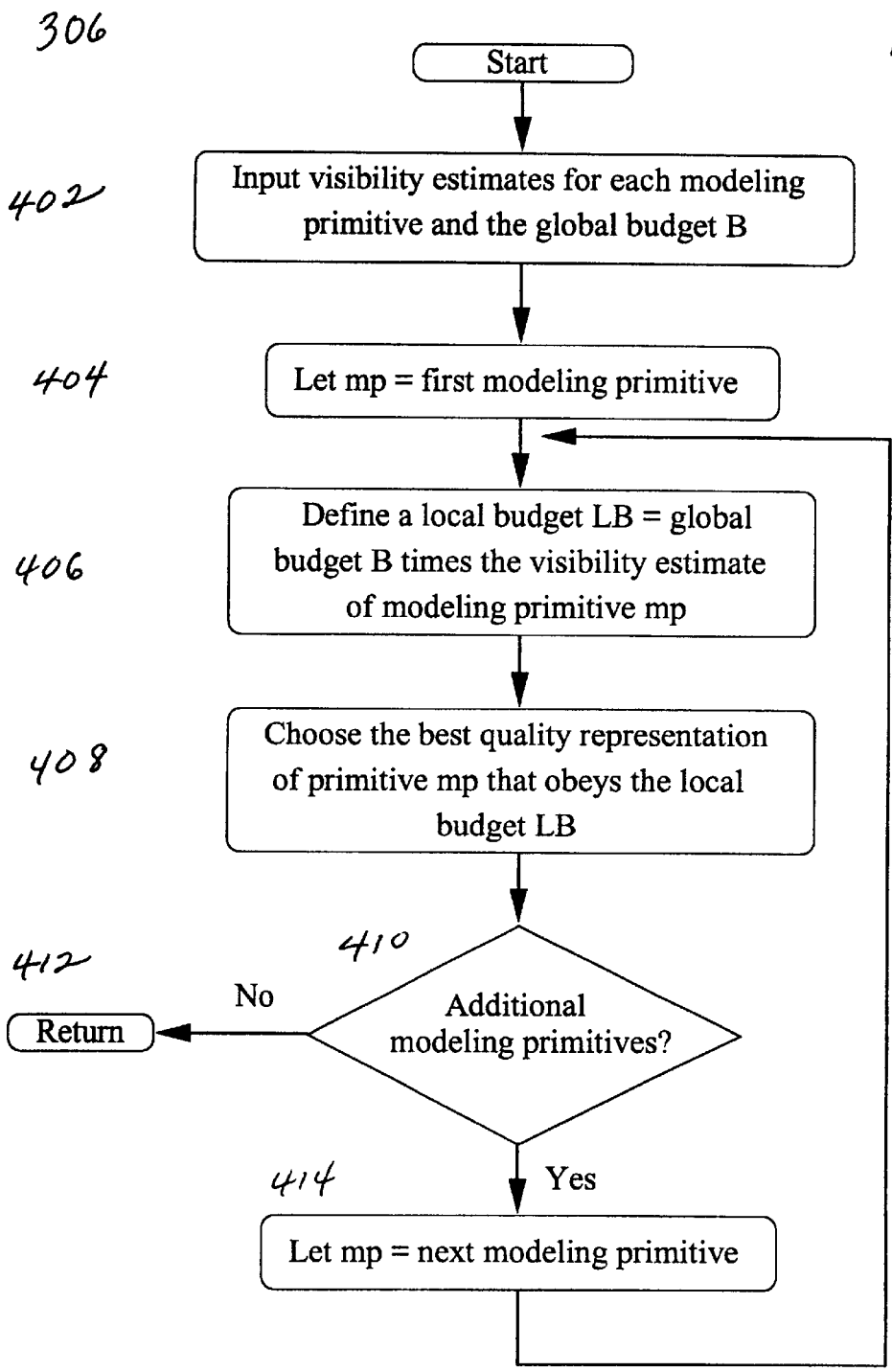

SYSTEM AND PROCESS FOR LEVEL OF DETAIL SELECTION BASED ON APPROXIMATE VISIBILITY ESTIMATION

FIELD OF THE INVENTION

This invention relates to the field of computer image processing. More specifically, the invention relates to the field of level-of-detail selection for rendering.

BACKGROUND OF THE INVENTION

A large portion of the computer graphics literature deals with the rendering problem. For a scene S, composed of modeling primitives (e.g., triangles, spheres, cars), rendering consists of computing a visual representation of the primitives given an eye position, a view direction, and a field of view. Foley et al., "Computer Graphics, Principles and Practice", Second Edition, Addison-Wesley, Reading, Mass., 1990, which is here incorporated by reference in its entirety, contains further details about rendering.

There are several factors that contribute to the complexity of rendering a scene S. Two important ones are the total number of modeling primitives, and the complexity of each primitive, which can be measured in several ways, for instance, as the number of triangles that define the given primitive.

Resource limitations led inventors to propose several techniques for optimizing the rendering process. One such technique is proposed in U.S. patent application "SYSTEM, PROGRAM PRODUCT AND METHOD OF RENDERING A THREE DIMENSION IMAGE ON A DISPLAY", Ser. No. 09/296,077, filed Apr. 29, 1999, by J. Klosowski and C. Silva, which is here incorporated by reference in its entirety, where a technique for visibility estimation is proposed.

Another popular technique, originally proposed by J. Clark, "Hierarchical geometric models for visible surface algorithms", Communications of the ACM, 19(10):547–554, October 1976, for rendering optimization consists of generating several 'level-of-detail' representations for each modeling primitive. Originally, a modeling primitive is specified in full detail, also known as full-resolution. Prior art simplification algorithms, which are surveyed in "Survey of polygonal surface simplification algorithms", in Multi-resolution Surface Modeling Course Notes, ACM SIGGRAPH, 1997, by Paul S. Heckbert and Michael Garland, (this survey is here incorporated by reference in its entirety), can be applied to the full-resolution model to reduce the rendering complexity, while still providing reasonable visual fidelity to the original full-resolution model. Using the simplification methods, several level-of-detail representations can be generated for a model, ranging from the full-resolution model, with the greatest rendering complexity, to a very simplified model, with the least rendering complexity. At render time, a single level-of-detail representation is selected for each modeling primitive in an attempt to lower the total rendering cost of the scene, while keeping the visual quality of the final image high. A simple example of this idea is to have different representations for a car, and when the user is looking at it from far away using a simpler representation, since the user will not be able to distinguish fine details of the car anyway, than when the car is nearby, and more details of the car will be visible to the user.

PROBLEMS WITH THE PRIOR ART

The prior art lacks a technique for level-of-detail selection that is based upon visibility information. Rather, prior art techniques base their level-of-detail selection on simple geometric facts, such as screen-space coverage. This coupling of visibility information and level-of-detail representation would provide improved image quality over the prior art at the same rendering cost.

OBJECTS OF THE INVENTION

An object of this invention is an improved system and method for selecting portions of geometry, and their level-of-detail representation to be rendered in an image processing system.

An object of this invention is an improved system and method for selecting portions of geometry and their level-of-detail representation to be rendered within budget constraints.

SUMMARY OF THE INVENTION

The present invention is a technique and system for selecting level-of-detail representations of geometric models to be rendered within an image processing system.

For each modeling primitive, 'fractional' visibility estimations are computed, thereby ranking how likely it is that a modeling primitive is visible, given the current viewing position, view direction, and field of view. Using these rankings, an appropriate level-of-detail for each modeling primitive is selected to optimize the rendering process by reducing the overall rendering complexity of the scene S, e.g., by reducing the total number of triangles that need to be rendered, while preserving the quality of the final image produced and displayed upon the screen.

The present invention includes two main steps: (1;) a visibility estimation process; and (2) a level-of-detail selection process.

The visibility estimation process provides estimates, e.g., probabilities, as to how likely it is that each of the modeling primitives in a given scene are visible for the current viewing parameters. In the preferred embodiment, this process is the Prioritized-Layered Projection (PLP) technique discussed in U.S. patent application Ser. No. 09/296,077 incorporated above. The PLP method can provide visibility estimations on a per model basis or upon a per cell basis, where, as described in the aforementioned patent application, the union of all cells provide a subdivision of the space occupied by the models in the scene.

The level-of-detail selection process determines which representations of the models will be rendered to produce the displayed image. Level-of-detail is utilized when the capabilities of the imaging system are not sufficient to render the full-resolution models within a specific budget B, e.g., a specified amount of time. Visibility estimates $v1, v2, \ldots, vN$, are provided for N modeling primitives $m1, m2, \ldots, mN$. In the preferred embodiment, the visibility estimates are fractions between 0.0 and 1.0, and will sum to 1.0, although alternative visibility estimates could also be used and then scaled appropriately. Level-of-detail selection can be accomplished on a per model basis by choosing the best representation of the model i that is constrained to the budget of (B times vi). In other words, each modeling primitive is assigned a fraction of the budget B that is directly proportional to its likelihood of being visible. The budget can be either a time constraint or a number of triangles. Since each model will obey its allocated budget, the global budget B for the imaging system will also be met.

BRIEF DESCRIPTION OF THE FIGURES

The foregoing and other objects, aspects, and advantages will be better understood from the following detailed preferred embodiment description with reference to the drawings, in which:

FIG. 4 is a level-of-detail selection process flow chart for deciding which representations for geometric models will be rendered.

DETAILED DESCRIPTION OF THE INVENTION

Figure 1:
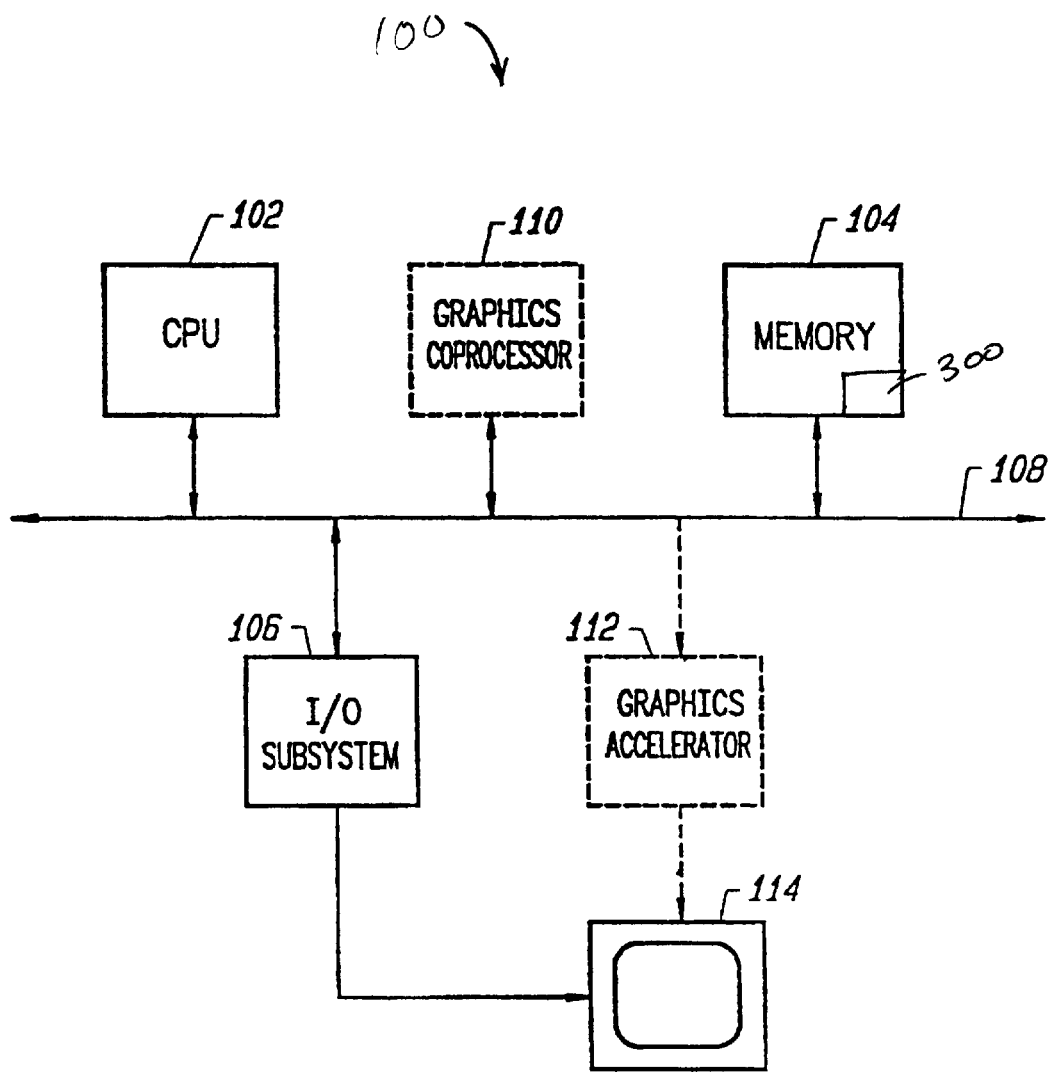
FIG. 1 is a block diagram of a preferred embodiment image processing system.

Referring now to the drawings, and more particularly, FIG. 1 is a block diagram of a preferred embodiment image processing system 100 that includes, as a minimum, one or more Central Processing Units (CPU) 102, one or more memory subsystems 104 and an Input/Output (I/O) subsystem 106 communicating through a data bus 108. Optionally, the system may include a graphics coprocessor 110 to off load graphics processing from the CPU 102, thereby reducing CPU computation-intensive tasks. Additionally, the preferred embodiment system 100 may include an optional graphics accelerator subsystem 112. Processed images are visualized on a display 114. These components are well known. A novel geometric rendering process 300, described in more detail in FIG. 3, is executed by one or more of the CPUs.

Figure 2:
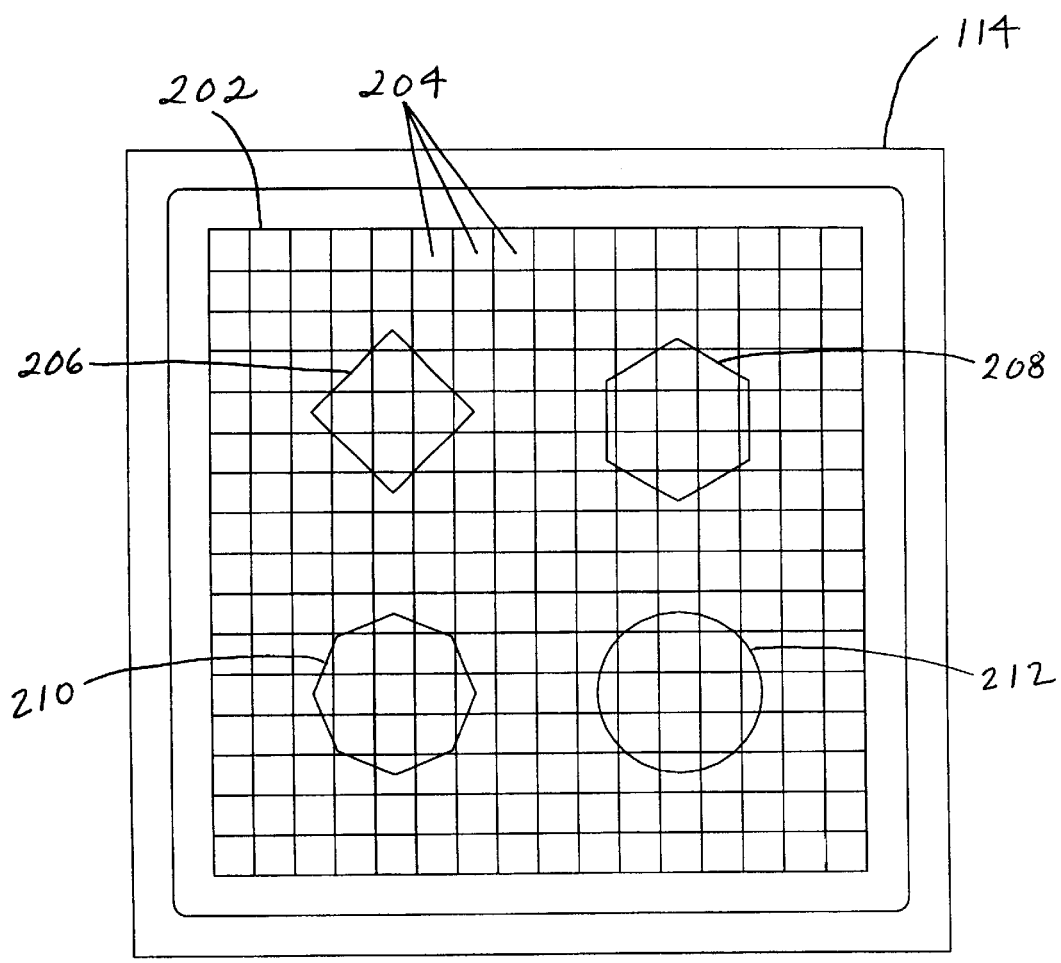
FIG. 2 is an example of an image rendered on a display.

FIG. 2 is an example of an image rendered on a display 114. The display area 202 is subdivided into display cells 204, normally referred to as pixels. Several modeling primitives, 206, 208, 210, and 212, shown on the display 114, are a portion of the displayed three-dimensional scene. The primitives are projections of three-dimensional modeling primitives onto a two-dimensional "image space" of the display area 202. In this example, the three-dimensional modeling primitives are all identical circles, rendered at various levels-of-detail in this figure. Primitive 212 is the projection of the circle at full-resolution, whereas, primitives 206, 208, and 210, are examples of simplified levels-of-detail, ranging from more to less levels of simplification. More specifically, primitive 212, which is rendered at full-resolution, has 24 polygons, primitive 210 is a simplified level-of-detail representation of the circle and has only 8 polygons, primitive 208 is a more simplified level-of-detail representation of the circle and has only 6 polygons, and primitive 206 is the most simplified level-of-detail representation of the circle and has just 4 polygons. All of these primitives represent the same object, a circle, but by using these level-of-detail representations, the modeling primitives can be rendered at varying costs, in exchange for varying losses in image quality.

Figure 3:
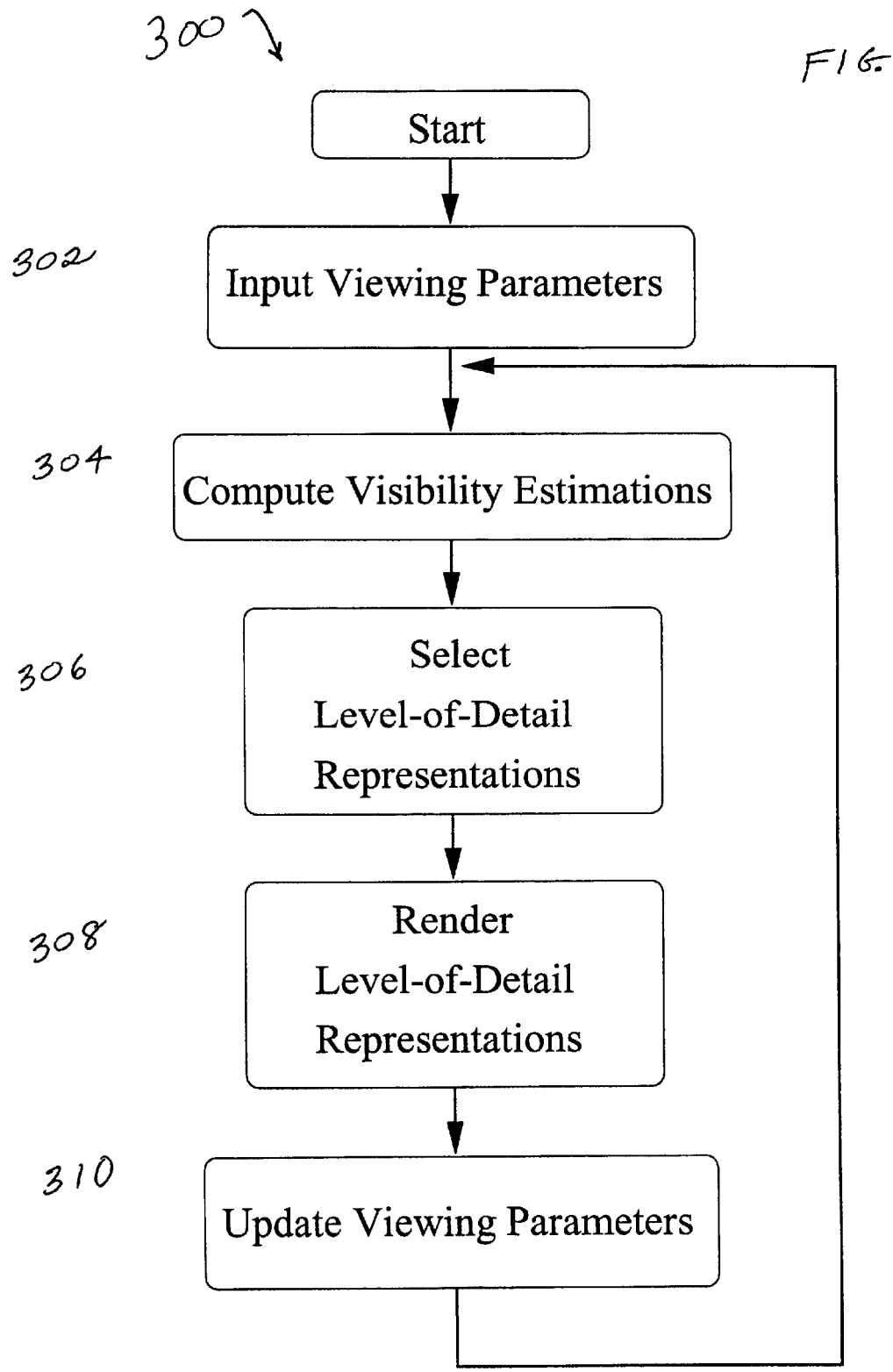
FIG. 3 is a flow chart of the preferred embodiment geometric rendering process according to the present invention.

FIG. 3 is a flow chart of the preferred embodiment geometric rendering process 300 according to the present invention, which contains a novel level-of-detail selection process 306 that chooses, for each modeling primitive in a scene, a level-of-detail representation to render in order to produce the final image on the display 114. As in the example presented in FIG. 2, if a scene contains four circles, the level-of-detail selection process would choose a representation to render for each of the four circles to produce the final image. In this particular case, the selection process chose to render a different level-of-detail representation for each of the circles.

The preferred embodiment geometric rendering process initially takes as input the viewing parameters 302, such as the viewer's eye position, viewing direction, and field of view, necessary for rendering modeling primitives to produce an image to be shown on the display 114. These parameters are traditionally specified by the user to indicate the portion of the scene that is of particular interest to the user. In addition, the user can specify a global budget B to limit the amount of resources used by the image processing system as it renders an image on the display 114. For example, the budget B can be a limit in the amount of time that the image processing system has to produce the image, or it could be a limit in the number of polygons, e.g., triangles, that the image processing system is allowed to render to produce the final image. Such a budget B is specified by the user to guarantee that the images produced by the image processing system will occur in a reasonable amount of time, e.g., within a fraction of a second. In the first step 304, visibility estimations are computed for each modeling primitive in the scene, thereby ranking how likely it is that a primitive is visible to the viewer. Such estimations can be computed using the above referenced PLP method. Referring once again to our scene composed of four circles, the PLP method can output four probabilities, one for each circle, indicating how likely it is that the circle is visible to the user given the current viewing parameters 302. For example, the PLP method could output probabilities of 0.09, 0.13, 0.24, and 0.54, to indicate that circle one has only a 9 percent chance of being visible to the user, whereas circle 4 has a 54 percent chance of being visible.

Based upon the visibility estimates computed in step 304 and the global budget B specified by the user in step 302, level-of-detail representations are selected 306 for each of the modeling primitives in the scene. Specific details of the level-of-detail selection process are highlighted below in FIG. 4. The selected representations are then rendered 308 to produce the image shown on the display 114. By observing the global budget B when selecting which level-of-detail to render for each modeling primitive, the image processing system therefore stays within the specified budget constraint B. Once the viewer has updated the viewing parameters in step 310 to get a different view of the scene, the process returns to step 304 to recompute the visibility estimations for the modeling primitives. The rendering process continues onward from this stage as previously described.

FIG. 4 is a flow chart of the novel level-of-detail selection process 306 for deciding which representations of modeling primitives will be rendered to produce the final image. The selection process 306 will ensure that the rendering process 308 will obey the user-defined global budget B, which can be either a maximum amount of time or number of polygons that can be rendered. For example, in our scene of four circles, the user may have specified that the image processing system must stay within a budget of 48 polygons when rendering the representations. Therefore, our level-of-detail selection process must then determine which representations to use for each circle so as to render the complete scene with no more than 48 polygons.

The goal of the level-of-detail selection process 306 is to chose representations for each of the modeling primitives in the scene. We do this on a per model basis, selecting independently for each model which representation the rendering process should use. To guarantee that the rendering process 308 will obey the global budget B, we assign a portion of B to each of the modeling primitives, thereby giving them each a local budget (LB) that they must obey. The assignment of the budgets to the modeling primitives is done in direct proportion to the likelihood that the modeling primitive is visible to the user. That is, we multiply the fractional visibility estimate for each modeling primitive by the budget B, to get a local budget for each modeling primitive. As long as the level-of-detail selection process obeys the local budget for each of the modeling primitives, the global budget B will also be met. Essentially, the algorithm divides up the global budget B amongst all of the modeling primitives, the level-of-detail selection process observes the local budgets when selecting an appropriate level-of-detail for each model, and consequently, the rendering process 308 will also observe the global budget B.

More specifically, in step 402, the visibility estimates for each modeling primitive that were computed in step 304 are input to the level-of-detail selection process 306. In addition to the visibility estimates, the level-of-detail selection process also accepts as input a global budget B, that must be observed by the selection process. That is, the selection process must guarantee that the rendering process 308 will stay within the desired budget B.

Variable mp is a temporary variable that is simply used to loop through all of the modeling primitives in the scene. It is initially assigned the first modeling primitive in step 404. For the current modeling primitive mp, a local budget LB, which is used to determine the level-of-detail representation to use for this modeling primitive, is defined 406 to be equal to the global budget B times the visibility estimate of mp. Modeling primitive mp is thereby granted the proportion of the global budget B based upon its likelihood of being visible to the viewer.

Once the local budget LB is defined as described above for modeling primitive mp, the level-of-detail representation is chosen 408 which provides the best quality while obeying its budget LB. In other words, the selection process chooses the representation of the modeling primitive mp that provides the best visual quality, while at the same time does not exceed its allocated budget. The best visual quality representation for each model is the full-resolution representation, however, this representation typically is too costly to render and exceeds the local budget LB. Thus, the level-of-detail representation that is closest in visual quality to the full-resolution model while still obeying the local budget will be the representation chosen for this modeling primitive.

Returning to our example scene containing four circles, the visibility estimates for the circles were 0.09, 0.13, 0.24, and 0.54. The global budget B was specified to be 48 polygons, i.e., the rendering process 308 could not render any more than 48 polygons to produce the final image. If we consider the first circle, the local budget that would be assigned to it would be (0.09*48)=4.32. Consequently, the level-of-detail selection process would chose the representation that was closest to the full-resolution model of the circle, while not containing any more than 4.32 polygons. Recalling from FIG. 2, there were only four representations that could be chosen for each circle, having either 4, 6, 8, or 24 polygons in total. Thus, the selection process would chose the representation having 4 polygons to represent circle 1 in the final image. This is exactly what was rendered for primitive 206 in FIG. 2. Circle 2 would have a local budget of (0.13*48)=6.24 polygons, and consequently the selection process would select the level-of-detail representation that is closest to the full-resolution model while observing this budget; therefore the representation with 6 polygons would be chosen. Circle 3 would have a local budget of (0.24*48)=11.52, and so the representation with 8 polygons would be chosen as the level-of-detail for circle 3. Finally, circle 4 would have a local budget of 25.92 polygons, and the selection process could to chose the full-resolution model of the circle since it has only 24 polygons in total.

Continuing with the description of the flow chart in FIG. 4, after selecting the appropriate level-of-detail representation for modeling primitive mp, a check 410 is made to see if there are any remaining modeling primitives that need level-of-detail representations chosen for. If there are not, the process has chosen a level-of-detail representation for each modeling primitive in the scene and is finished. Therefore, the process returns in step 412. Otherwise, the variable mp is updated in step 414 to refer to the next modeling primitive in the scene, and the process returns to step 406.

In the present invention, we propose to add level-of-detail selection by using the fractional visibility estimations disclosed in the above referenced PLP method. While the preferred embodiment of the present invention utilizes the visibility estimations provided in the previous invention, other embodiments of visibility estimations would be apparent to those skilled in the art given this disclosure and are also within the contemplation of the inventors.

We claim:

1. A method of rendering a three-dimensional scene on a computer system display, the method comprising the steps of:
   a) determining one or more visibility estimates of one or more modeling primitives in the three-dimensional scene;
   b) selecting a level-of-detail representation for one or more of the modeling primitives based on one or more of the visibility estimates for the respective modeling primitive; and
   c) rendering an image with one or more of the modeling primitives where a resolution of the modeling primitive in the image is determined by the level-of-detail representation for the respective modeling primitive.

2. A method, as in claim 1, where the image has a global budget limiting the resolution of a combination of two or more of the modeling primitives rendered.

3. A method, as in claim 2, where a local budget is determined for each of one or more of the modeling primitives by constraining the global budget by one or more visibility estimates of the respective modeling primitive.

4. A method, as in claim 3, where the level-of-detail is determined by scaling the global budget by the respective visibility estimation.

5. A method, as in claim 2, where the budget constraints can be a limit on the number of geometric primitives to be rendered.

6. A computer system for rendering a three-dimensional scene on a display, the system comprising:
   a) means for determining one or more visibility estimates of one or more modeling primitives in the three-dimensional scene;
   b) means for selecting a level-of-detail representation for one or more of the modeling primitives based on one or more of the visibility estimates for the respective modeling primitive; and
   c) means for rendering an image with one or more of the modeling primitives where a resolution of the modeling primitive in the image is determined by the level-of-detail representation for the respective modeling primitive.

7. A computer program product which performs the steps of:
   a) determining one or more visibility estimates of one or more modeling primitives in a three-dimensional scene;

b) selecting a level-of-detail representation for one or more of the modeling primitives based on one or more of the visibility estimates for the respective modeling primitive; and c) rendering an image with one or more of the modeling primitives where the resolution of the modeling primitive in the image is determined by the level-of-detail representation for the respective modeling primitive.

8. A computer system having one or more central processing units (CPUs), one or more memories, and one or more displays, the system further comprising:

a process, executed by one or more of the CPUS, comprising the steps of:

a) determining one or more visibility estimates of one or more modeling primitives, stored in one or more of the memories, in a three-dimensional scene;

b) selecting a level-of-detail representation for one or more of the modeling primitives based on one or more of the visibility estimates for the respective modeling primitive; and c) rendering, on one or more of the displays, an image with one or more of the modeling primitives where a resolution of the modeling primitive in the image is determined by the level-of-detail representation for the respective modeling primitive.

9. A system, as in claim 9, where the image has a global budget limiting the resolution of a combination of two or more of the modeling primitives rendered.

10. A system, as in claim 9, where a local budget is determined for each of one or more of the modeling primitives by constraining the global budget by one or more visibility estimates of the respective modeling primitive.

11. A system, as in claim 10, where the level-of-detail is determined by scaling the global budget by the respective visibility estimation.

12. A system, as in claim 9, where the global budget can place a limit on the number of geometric primitives to be rendered.

13. A system, as in claim 8, where one or more of the visibility estimates is computed by a Prioritized-Layered Projection (PLP) method.

* * * * *

UNITED STATES PATENT AND TRADEMARK OFFICE
CERTIFICATE OF CORRECTION

PATENT NO. : 6,831,636 B1
DATED : December 14, 2004
INVENTOR(S) : Klosowski et al.

It is certified that error appears in the above-identified patent and that said Letters Patent is hereby corrected as shown below:

Column 8,
Line 4, before "where" and after "system" replace "as in claim 9" with
-- as in claim 8 --.

Signed and Sealed this

Twentieth Day of September, 2005

JON W. DUDAS
*Director of the United States Patent and Trademark Office*